United States Patent
Kereth

(10) Patent No.: US 8,876,648 B2
(45) Date of Patent: Nov. 4, 2014

(54) PLANETARY BELT TRANSMISSION

(71) Applicant: Yefim Kereth, Rehovot (IL)

(72) Inventor: Yefim Kereth, Rehovot (IL)

( * ) Notice: Subject to any disclaimer, the term of this patent is extended or adjusted under 35 U.S.C. 154(b) by 0 days.

(21) Appl. No.: 14/032,028

(22) Filed: Sep. 19, 2013

(65) Prior Publication Data

US 2014/0087909 A1    Mar. 27, 2014

(30) Foreign Application Priority Data

Sep. 23, 2012 (IL) .......................................... 222078

(51) Int. Cl.
*F16H 9/26* (2006.01)
*F16H 7/02* (2006.01)

(52) U.S. Cl.
CPC ....................................... *F16H 7/02* (2013.01)
USPC ........................................................ 475/182

(58) Field of Classification Search
USPC ........................................................ 475/182
See application file for complete search history.

(56) References Cited

U.S. PATENT DOCUMENTS 2,459,969 A * 1/1949 Schweickart .................. 475/182
5,074,829 A * 12/1991 Menge, Sr. ..................... 475/182

* cited by examiner

*Primary Examiner* — Erin D Bishop
(74) *Attorney, Agent, or Firm* — Stetina Brunda Garred & Brucker

(57) ABSTRACT

A planetary belt transmission has a motor drive having a motor drive shaft, a distributing pulley attached to the motor drive shaft and a collecting pulley attached to an output shaft. Two or more distributing belts are coupled to the distributing pulley and two or more collecting belts are coupled to the collecting pulley from mutually opposite radial directions. Four or more transmitting pulleys are arranged in two or more concentric pairs around the distributing pulley and the collecting pulley and are coupled to the distributing pulley and the collecting pulley via the distributing belts and the collecting belts, respectively. Two or more peripheral shafts support the transmitting pulleys, while allowing movement in a radial direction only relative to the output shaft and being preloaded so as to apply a net zero radial force on the distributing pulleys and the collecting pulleys in a plane perpendicular to respective axes thereof.

4 Claims, 10 Drawing Sheets

PLANETARY BELT TRANSMISSION

CROSS-REFERENCE TO RELATED APPLICATIONS

The present application claims priority to Israeli Application No. 222078 filed on Sep. 23, 2013.

STATEMENT RE: FEDERALLY SPONSORED RESEARCH/DEVELOPMENT

Not Applicable

BACKGROUND

Field of the Invention

This invention relates to a planetary belt transmission. A typical propulsion system consists of a motor drive and a transmission that converts the motor drive torque and rotation velocity to torque and rotation velocity required by the propelled element (e.g. propeller). Planetary transmissions are widely implemented in different types of propulsion systems. Planetary transmission has certain advantages (e.g. input and output shafts are concentric, no side/radial loads on a motor drive shaft) but is also considered as relatively expensive and heavy. On the other hand, belt transmissions are also widely implemented in different types of propulsion systems. Belt transmissions are considered to be relatively inexpensive and simple but do not have the advantages of planetary transmission.

BRIEF SUMMARY

It is therefore an object of the present invention to provide a planetary belt transmission having the advantages of both planetary and belt transmissions.

This object is realized in accordance with a broad aspect of the invention by a planetary belt transmission, comprising:

a structure supporting a motor drive having a motor drive shaft;

a distributing pulley at least indirectly attached to the motor drive shaft;

a collecting pulley attached to an output shaft;

two or more distributing belts coupled to the distributing pulley from mutually opposite radial directions;

two or more collecting belts coupled to the collecting pulley from mutually opposite radial directions;

four or more transmitting pulleys arranged in two or more concentric pairs located around the distributing pulley and the collecting pulley and coupled to the distributing pulley and the collecting pulley via the distributing belts and the collecting belts, respectively;

two or more peripheral shafts supporting said two or more pairs of transmitting pulleys, and passing through elongated openings in said structure so as to allow movement in a radial direction only relative to the output shaft wherein said peripheral shafts are preloaded in a radial direction by two or more preload elements that are configured to stretch the distributing belts and the collecting belts via the pairs of transmitting pulleys so as to apply a net radial force approaching zero on to the distributing pulleys and the collecting pulleys in a plane perpendicular to respective axes of said pulleys.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Figure 1:
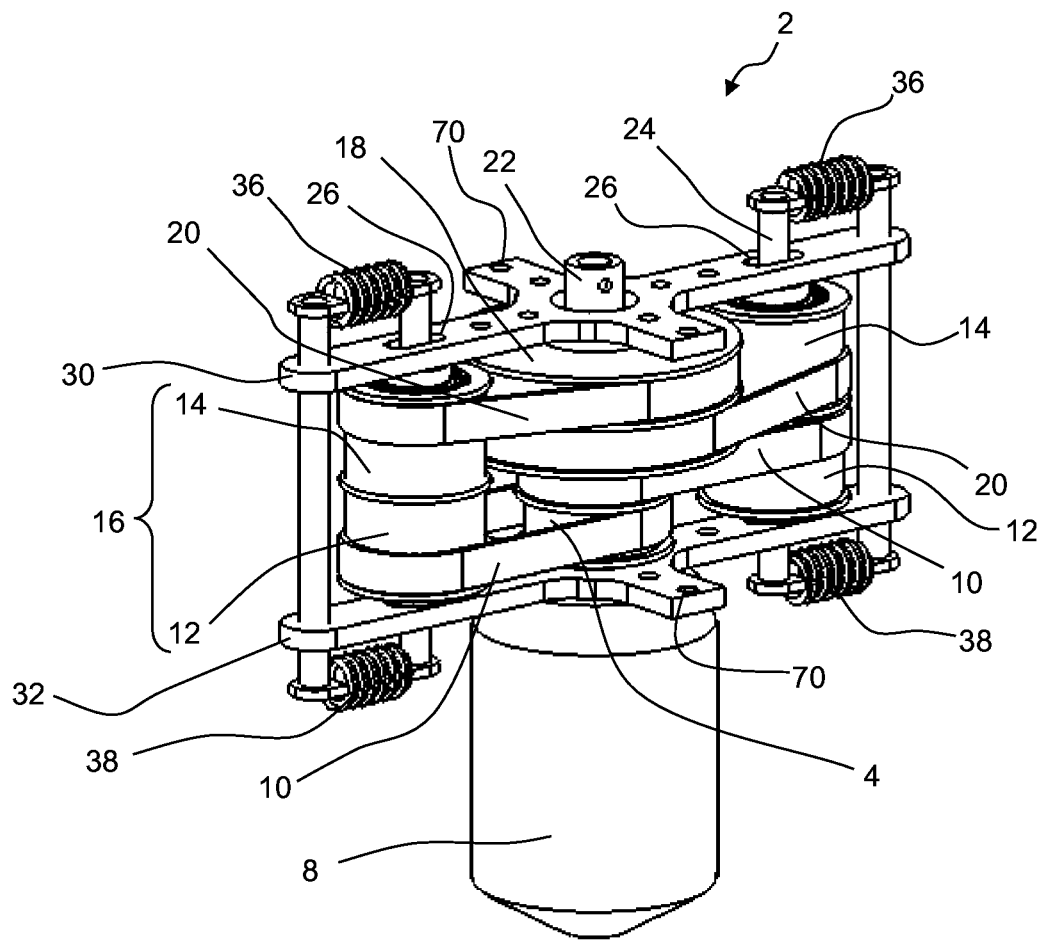
FIGS. 1, 2, 3 and 4 are detailed representation of a planetary belt transmission of "I" configuration in perspective, side, top and cross-section views.
Figure 2:
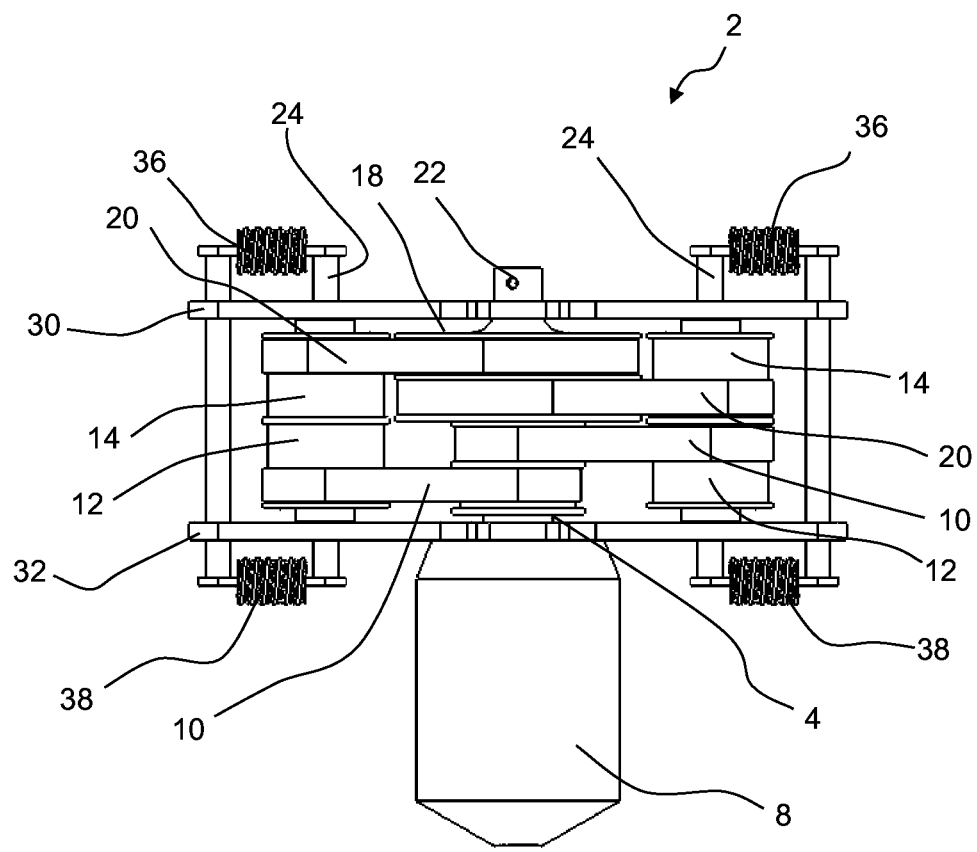
Figure 3:
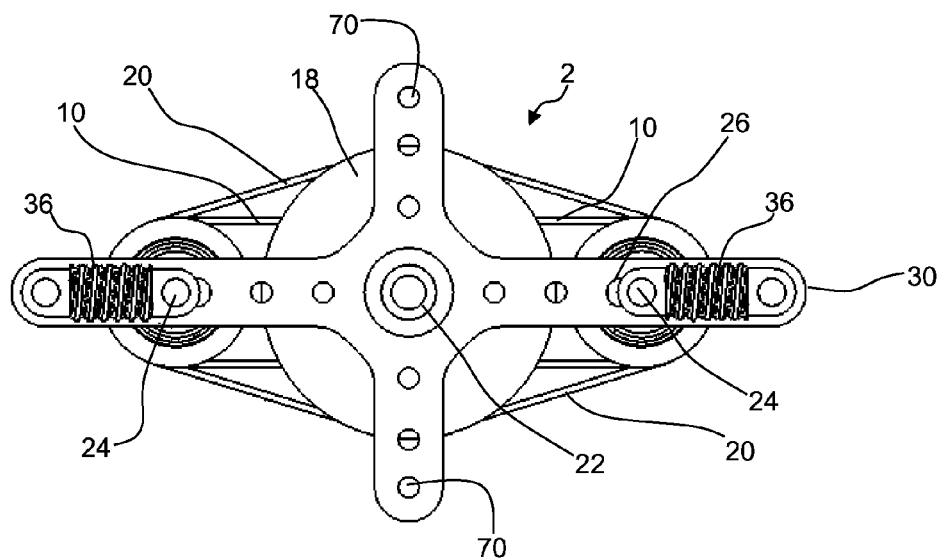
Figure 4:
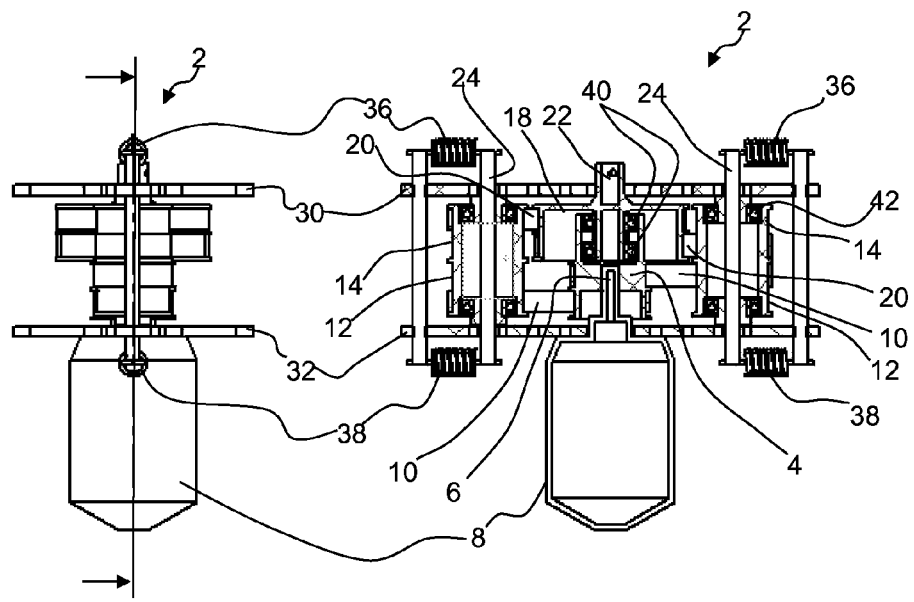

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

FIGS. 1 to 7 are detailed representations of a planetary belt transmission shown generally as 2 comprising a distributing pulley 4 attached to a drive shaft 6 (shown in cross-section in FIG. 4) of a motor drive 8 and distributing power (moment-rotation velocity) from the motor drive 8 via distributing belts 10 to two or more pairs of concentric transmitting pulleys 12 and 14, each pair being designated as 16, which convey power from the motor drive 8 to the collecting pulley 18 via the collecting belts 20. The power collected by the collecting pulley 18 is relayed to a propulsion element (not shown) which may be a propeller, wheel, etc. by an output shaft 22 coupled to the collecting pulley 18. Each pair 16 of transmitting pulleys 12 and 14 is commonly rotatable about a peripheral shaft 24, each of whose ends passes through a respective slot 26 (constituting an "elongated opening") on opposite sides of armatures 30 and 32 that serve as a support structure for supporting the motor drive 8. The support structure may be attached to a body on which the propelled element is powered (e.g. vehicle chassis or other platform) via apertures 70 in the armatures 30 and 32. The output shaft 22 is preferably coaxial with the drive shaft 6 of the motor drive 8, albeit not directly coupled thereto. The slots 26 constrain the shafts 24 to move along the slots 26, i.e. only in the radial direction relative to a central hub defined by the axis of the drive shaft 6. Preload elements 36 and 38, which may be springs, urge the shaft 24 in the radial direction, and create an appropriate tension in the distributing belts 10 and collecting belts 20. The preload force of the preload elements 36 and 38 is adjusted such that the net force created by all the preload elements 36 and 38 on the distributing pulley 4 and on the collecting pulley 18 approaches zero. This enables the motor drive 8 to face pure moment only and avoids the need for an additional bearing arrangement to support the drive shaft 6 against transverse or radial forces. Concomitantly, this ensures that the output shaft 22 provides pure moment only and cancels the need for an additional bearing arrangement where the output shaft 22 is coupled to the propulsion element. To ensure an equal preload force on both sides of each distributing pulley 4 and collecting pulley 18, and to remove the preload force from the armatures 30 and 32, a preload mechanism such as shown in FIGS. 8 and 9 can be implemented. In FIGS. 8 and 9, there is shown a first pair of arcuate preload arms 50 and 52 rotatable about a floating hinge (not shown) and second pair of arcuate preload arms 54 and 56, rotatable about a floating hinge 60. Both pairs of preload arms 50, 52 and 54, 56 are preloaded by respective preload elements, shown by way of example as bolts 62 and 64 and/or springs 36 and 38, thus subjecting the peripheral shafts 24 to equal and opposite forces and subjecting the distributing belts 10 and collecting belts 20, on both sides, to equal tensile forces.

The fact that the motor drive shaft 6 and output shaft 22 are subject to pure moment allows minimizing the structural requirements and the transmission weight and cost. The multi-channel power distribution of the motor drive 8 via two or more distributing belts 10 and pairs of transmitting pulleys 16 provides the flexibility to optimize the transmission configuration with respect to power-weight-volume-cost parameters.

Bearings 40 (FIG. 4) between the distributing pulley 4 and the collecting pulley 18 are needed for the operation of the transmission as a standalone module only. Once the collecting pulley 18 is attached to the propulsion element (e.g. propeller) via output shaft 22, the bearings 40 can be dispensed.

In this case, the collecting pulley 18 may be floating relative to the other parts of the transmission, and the bending moment, which is a result of the distance between the collecting belts 20, and can be easily absorbed by the bearing arrangement of the propulsion element.

Bearings 42 (FIG. 4) allows the pairs of pulleys 16 to rotate about the shaft 24. These bearings may be of low capacity as they carry only 50% of the load in the "I" configuration, 33% of the load in the "Y" configuration (not shown) or 25% of the load in the "X" configuration (FIGS. 5 to 7).

The belt planet is defined by all the elements in the same radial direction (except the distributing and collecting pulleys 4 and 18), namely: a) distributing and collecting belts 10 and 20; b) the pair 16 of transmitting pulleys 12 and 14; c) peripheral shaft 24; d) bearings 42; e) preload elements 36 and 38; f) the armatures 30 and 32 that supports the abovementioned elements.

Figure 5:
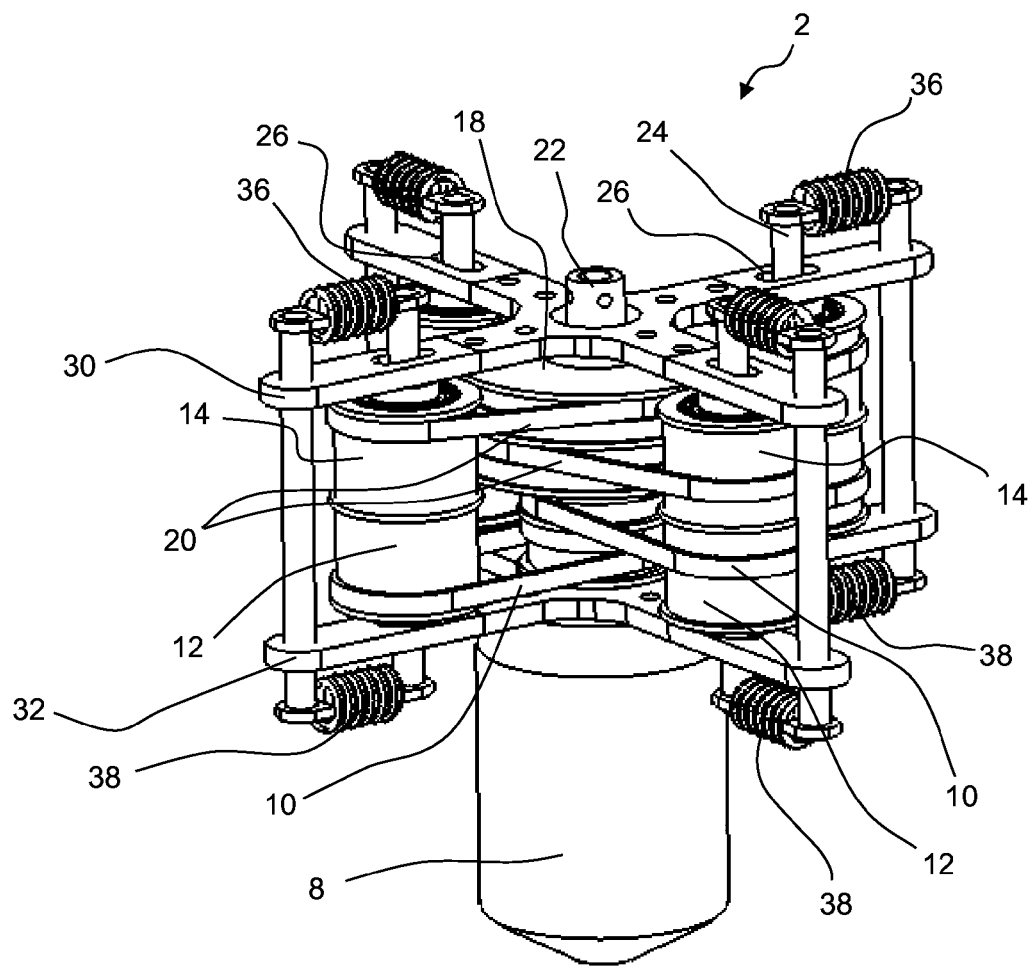
FIGS. 5, 6 and 7 are detailed representations of planetary belt transmission of "X" configuration in perspective, side and top views.
Figure 6:
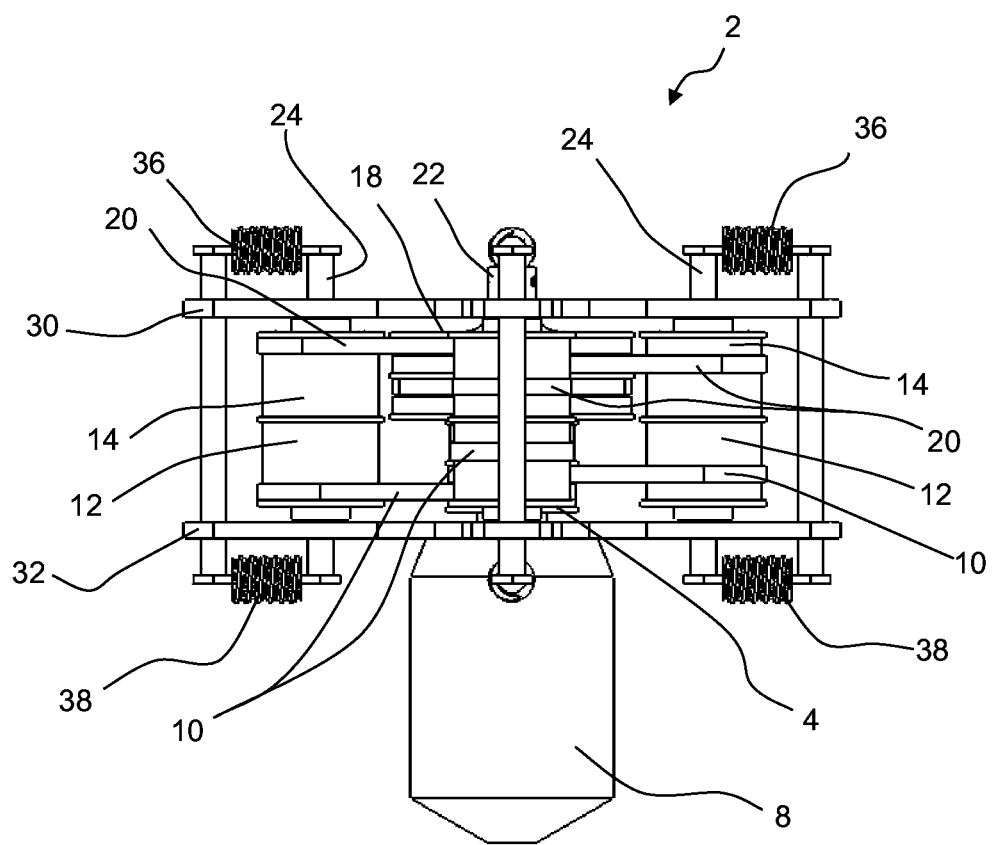
Figure 7:
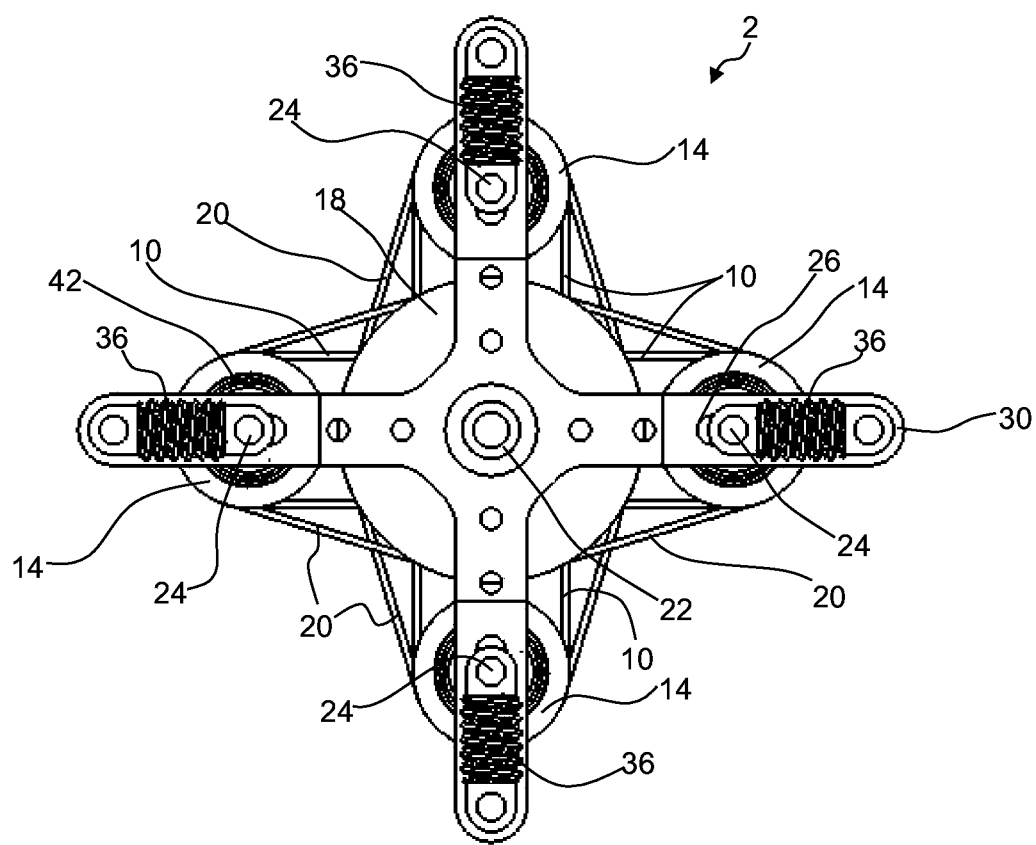
Figure 8:
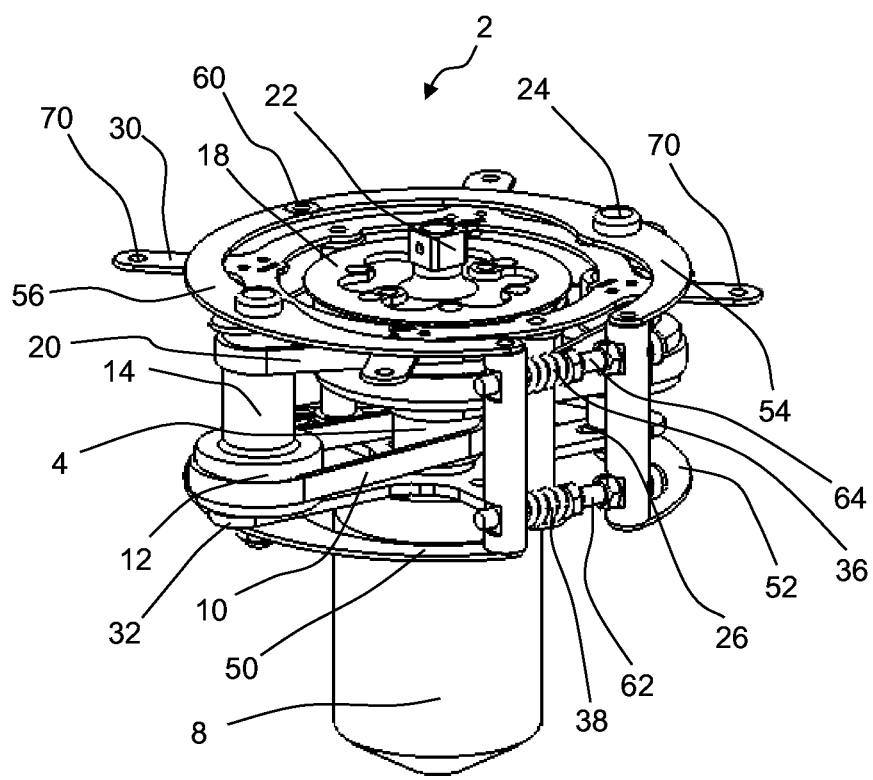
FIGS. 8 and 9 are detailed perspective and side views, respectively, of a planetary belt transmission of "I" configuration with an equal force preload mechanism.
Figure 9:
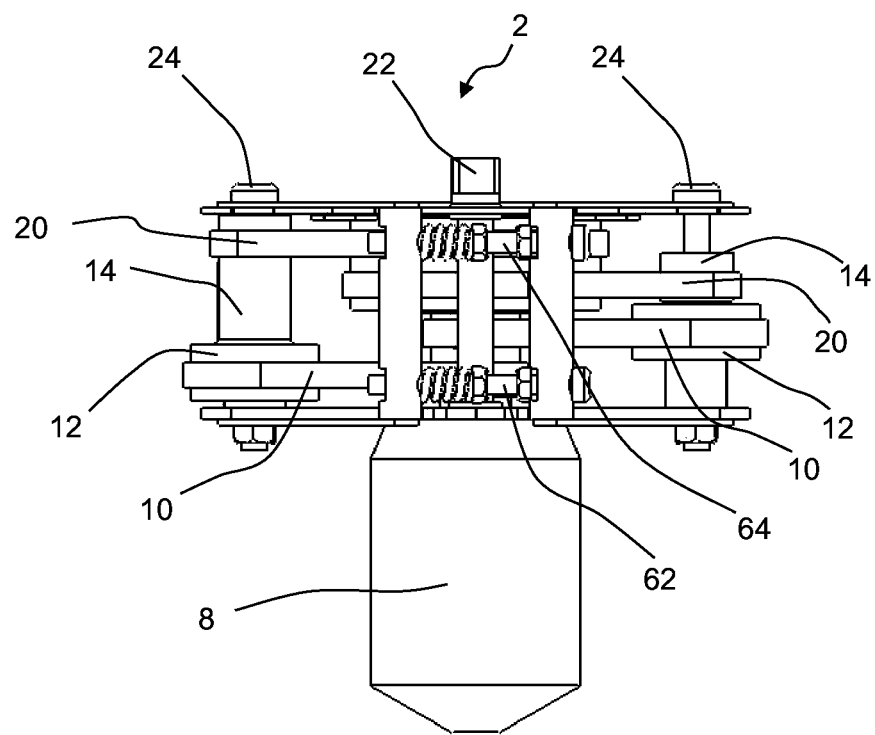

The configurations represented by FIGS. 1 to 9 are defined by the number of the belt planets. Thus, the "I" configuration shown in FIGS. 1 to 4 and FIGS. 8 and 9 is defined by two belt planets. The "Y" configuration (not shown) is defined by three belt planets and the "X" configuration shown in FIGS. 5 to 7 is defined by four belt planets. Other configurations, with higher numbers of belt planets, are possible, and can be implemented based on the embodiments described above.

The transmission ratio of the transmission of the FIGS. 1 to 9 calculated based on the pitch diameters, in the following way:

$$\text{transmission ratio} = \frac{D_c}{D_{14}} \times \frac{D_{12}}{D_d}$$

Wherein:
$D_c$=pitch diameter of the collecting pulley 18;
$D_{14}$=pitch diameter of the transmitting pulley 14;
$D_{12}$=pitch diameter of the transmitting pulley 12; and
$D_d$=pitch diameter of the distributing pulley 4.

With reference to the belt planetary transmission of the "I" configuration shown in FIGS. 1 to 4 the transmission ratio calculated based on the following pitch diameters:
$D_c$=40 mm;
$D_{14}$=20 mm;
$D_{12}$=20 mm; and
$D_d$=20 mm
is given by $$\frac{40}{20} \times \frac{20}{20},$$

i.e. 2.

This means that the rotation velocity of the output shaft 22 will be half the rotation velocity of the motor drive 8 and the output moment will be twice that of the motor drive 8.

Figure 10:
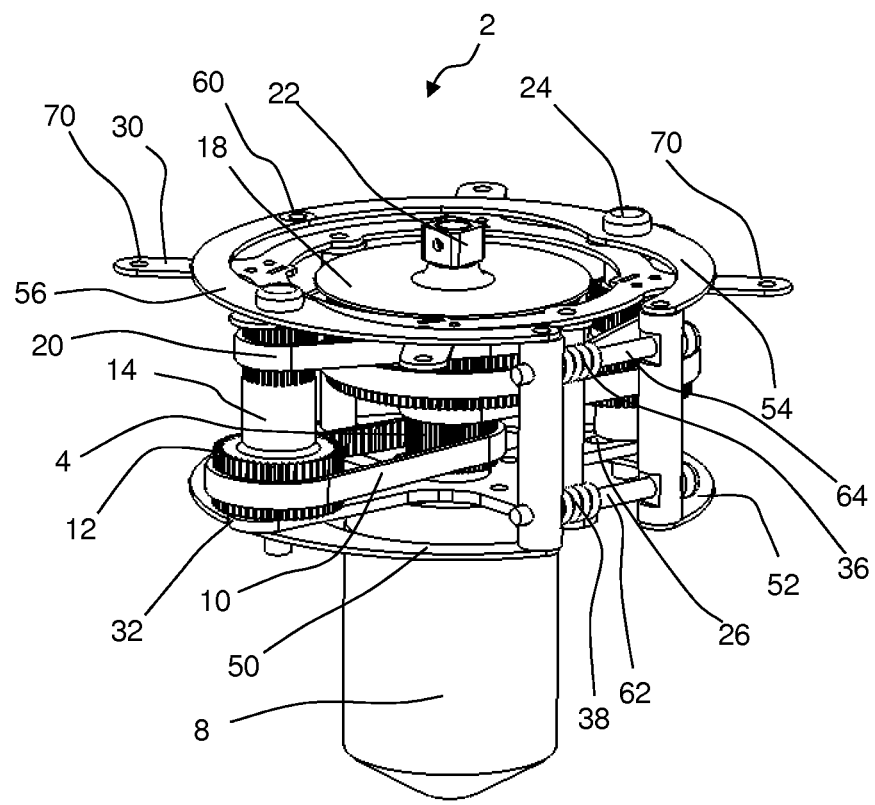
FIG. 10 is a detailed perspective of a planetary belt transmission having teeth coupling belts according to an alternative embodiments.

Although, for the sake of simplicity of the drawings, the pulleys and the belts in the figures are of the friction coupling, flat type, in all the embodiments as described, the belts and the pulleys can be of any other friction coupling (e.g. V belts, O belts) as shown in FIG. 8, or teeth coupling (e.g. timing belts) type, as shown in FIG. 10.

In addition, although, for the sake of simplicity, the transmitting pulleys 12 and 14 in the embodiments shown in FIGS. 1 to 7 are of equal diameters, the diameters of the transmitting pulleys 12 and 14 can be different, as shown in FIGS. 8 and 9, in order to achieve transmission ratio based on the two step reduction $$\left(\text{first step being based on } \frac{D_{12}}{D_d} \text{ and the second step based on } \frac{D_c}{D_{14}}\right).$$

It will be appreciated that although the planetary belt transmission has been described with specific reference to vehicle propulsion, this is by way of non-limiting example only and the planetary belt transmission according to the invention may be used in other configurations or applications. Likewise, while in the embodiments described above the planetary belt transmission has a single shaft input/output, in other applications the planetary belt transmission may have multi-input and/or multi-output shafts. For this purpose, the pairs 16 of transmitting pulleys can be either powered by additional motor drives 8 attached to the pairs 16 of transmitting pulleys and to the structure 30 and/or 32, or serve as additional output shafts.

Figure 11:
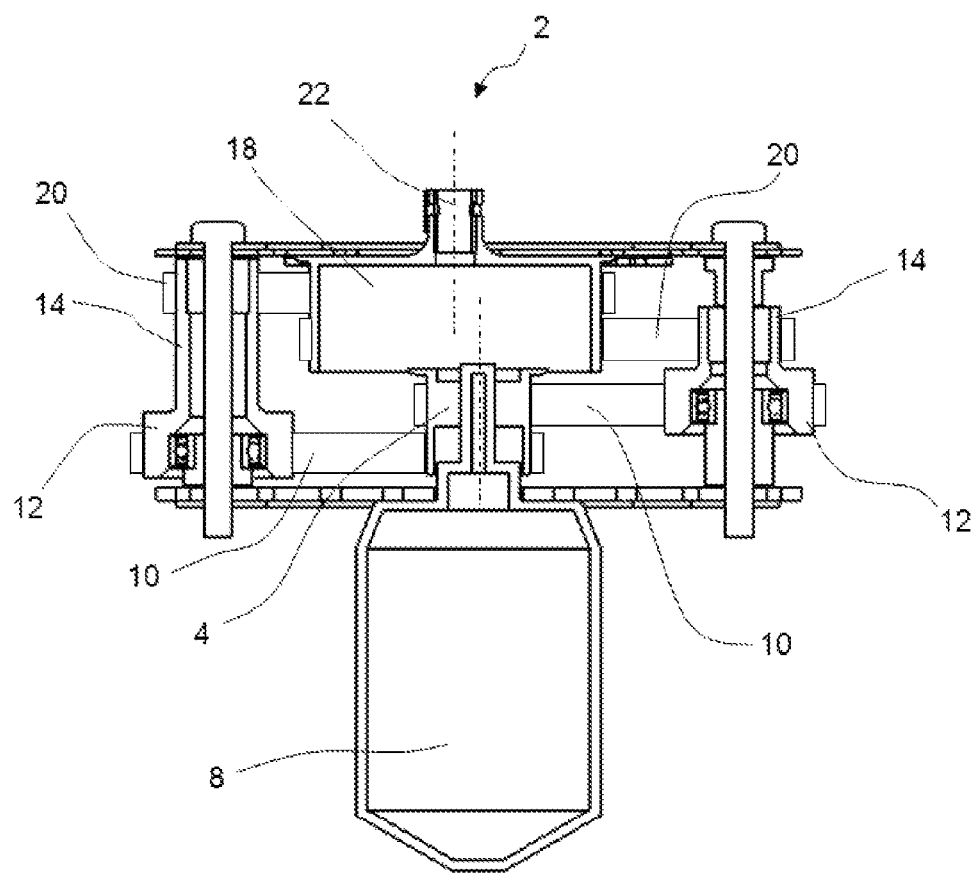
FIG. 11 is a partial cross-sectional view of a planetary belt transmission having a collecting pulley that is non-concentric to the distributing pulley.

In the embodiments as described, the collecting pulley 18 is represented as concentric to the distributing pulley 4. This configuration is considered as more compact, but it is not the only configuration. As shown in FIG. 11, the collecting pulley 18 may be eccentric to the distribution pulley 4 if the distribution belts 10 and/or the collecting belts 20 are of different lengths.

What is claimed is:
1. A planetary belt transmission, comprising:
a structure supporting a motor drive, said motor drive having a motor drive shaft;
a distributing pulley at least indirectly attached to the motor drive shaft;
a collecting pulley attached to an output shaft;
two or more distributing belts coupled to the distributing pulley from mutually opposite radial directions;
two or more collecting belts coupled to the collecting pulley from said mutually opposite radial directions;

two or more concentric pairs of first and second transmitting pulleys located around the distributing pulley and the collecting pulley, the respective first transmitting pulley in each pair being coupled to the distributing pulley via the distributing belts and the respective second transmitting pulley in each pair being coupled to the collecting pulley via the collecting belts;

two or more peripheral shafts each supporting a respective one of said pairs of transmitting pulleys, each of the peripheral shafts passing through elongated openings in said structure so as to allow movement in a respective one of said mutually opposite radial directions only relative to the output shaft; and wherein, said peripheral shafts are preloaded in said mutually opposite radial directions by two or more preload elements that are configured to stretch the distributing belts and the collecting belts via the pairs of transmitting pulleys so as to apply a net radial force approaching zero on to the distributing pulleys and the collecting pulleys.

2. The planetary belt transmission according to claim 1, wherein the distributing pulley, the collecting pulley, the transmitting pulleys and the distributing belts and the collecting belts are of teeth coupling or of friction coupling type.

3. The planetary belt transmission according to claim 1, wherein the collecting pulley is concentric to an axis of the distributing pulley.

4. The planetary belt transmission according to claim 1, wherein the collecting pulley is non-concentric to an axis of the distributing pulley.

* * * * *